Patented Sept. 3, 1940

2,213,469

UNITED STATES PATENT OFFICE 2,213,469

ARALKYL MORPHOLINES

Marlin T. Leffler, Lake Bluff, Ill., assignor to Abbott Laboratories, North Chicago, Ill., a corporation of Illinois No Drawing. Application September 20, 1937, Serial No. 164,759

8 Claims. (Cl. 260—247)

The present invention relates to aralkyl morpholines and more in particular to halogenated and amino substituted aralkyl morpholines.

The compounds of my invention may be represented by the following general formula:

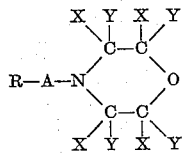

in which R represents a substituted or unsubstituted phenyl or naphthyl group, A represents a saturated or unsaturated aliphatic hydrocarbon group and X and Y represent hydrogen or alkyl groups.

More particularly the present invention relates to the use as local anesthetics of morpholine compounds represented by the following formula:

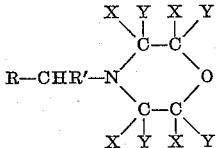

in which R represents a phenyl group including substituted phenyl group in which the substituent is a halogen atom, amino group or an alkoxy group, R' represents hydrogen or a methyl group, and X and Y represent hydrogen or alkyl groups.

I have discovered that the compounds of my invention possess pronounced and valuable local anesthetic properties. For example, investigations have shown the compounds to possess a low toxicity coupled with a high efficiency.

The following examples describing the preparation of various compounds of my invention will serve for illustrative purposes:

EXAMPLE I

(N)-P-aminobenzyl morpholine

About 35 grams of morpholine and about 34.3 grams of p-nitrobenzyl chloride are dissolved in about 150 c. c. of dry benzene. The solution is then heated at a refluxing temperature for about 5 to 6 hours during which time some morpholine hydrochloride separates. At the completion of the reaction, the reaction mixture is cooled and the solid material is separated from the liquid by filtration. The clear filtrate is then extracted twice with water and the benzene layer dried over anhydrous sodium sulfate. Upon evaporation of the benzene the crude p-nitro-benzyl morpholine is obtained. This product may be purified in the usual manner by recrystallization from alcohol. The final product which is in the form of light yellow prisms has a melting point of about 79°–80° C.

The nitrobenzyl morpholine may be reduced to the aminobenzyl morpholine by the usual procedure, e. g. by the use of an excess of iron turnings in practically a neutral solution, a few drops of concentrated hydrochloric acid being added to start the reaction. As soon as the reduction is complete most of the water is allowed to evaporate and the p-aminobenzyl morpholine extracted from the mixture with hot benzene. Subsequent vacuum evaporation of the solvent and recrystallization of the residue from ethyl acetate gives p-aminobenzyl morpholine as colorless leaflets melting at about 100.5°–101.5° C.

The p-aminobenzyl morpholine monohydrochloride may be prepared by adding the calculated amount of absolute alcoholic hydrogen chloride to a solution of the free base dissolved in a mixture of ethyl acetate and pentane. The hydrochloride separates as a pale yellow solid which may be recrystallized from a mixture of ethyl acetate and absolute alcohol in leaflet form. The p-aminobenzyl morpholine hydrochloride melts at about 188°–190° C.

In a manner similar to that described in Example I, other amino derivatives together with the bromo-, chloro-, and alkoxy-derivatives may be prepared by condensing morpholine with the properly substituted aralkyl halide. Similarly to the method described in Example I, the phenylethyl-, phenyl-propyl-, etc., together with the naphthyl-alkyl-morpholines may be prepared by selecting the proper aralkyl derivative. By following the method described in Example I it is likewise possible to prepare derivatives in which the alkyl group connecting the aromatic hydrocarbon group to the morpholine group is unsaturated. For example, a derivative containing an unsaturated alkyl group may be prepared by condensing cinnamyl halide with morpholine.

In addition, my invention includes derivatives in which the morpholine group contains alkyl groups such as methyl, ethyl, propyl, etc., substituted on the 2, 3, 5 and 6 positions. These derivatives may be prepared by the method described in Example I by condensing the aralkyl halide with the properly alkyl substituted morpholine.

The following example will illustrate the preparation of the halogen, amino-substituted aralkyl morpholine derivatives.

EXAMPLE II

(N)-m,m'-dibromo-p-aminobenzyl morpholine

A solution of about 16 grams of bromine dissolved in about 35 c.c. of glacial acetic acid is added dropwise with stirring to a solution of about 9.6 grams of p-amino-benzyl morpholine (prepared as in Example I) dissolved in about 150 c.c. of glacial acetic acid. The temperature of the reaction mixture should be maintained at about 15°–20° C. during the addition of the bromine. As soon as all of the bromine has been added, the solid material is separated by filtration and dissolved in water. The cold filtered solution is then made alkaline with dilute sodium hydroxide and the m,m'-dibromo-p-aminobenzyl morpholine separates as an oil which soon solidifies. The final product recrystallized from alcohol melts at about 61°–62° C.

The following example will illustrate the preparation of the alkoxy-substituted aralkyl morpholine compounds.

EXAMPLE III

4-butoxy-3-aminobenzyl morpholine

A mixture of about 78.4 grams of o-butoxy-nitro-benzene, 9 grams of para-formaldehyde, 1 gram of anhydrous zinc chloride and 300 c.c of petroleum ether (b. pt. 85°–100° C.) is treated for about 5 hours under efficient stirring with a vigorous stream of dry hydrogen chloride. At the end of this time the temperature of the reaction mixture is raised to about 85° C. where it is held for 10 hours, the stirring and hydrogen chloride treatment being continued throughout the entire period. When the reaction is complete the cooled mixture is washed rapidly with cold water and dried over anhydrous sodium sulphate. The solvent is then removed and the residue vacuum distilled in the usual manner. The 4-butoxy-3-nitrobenzyl chloride distills at 162°–165° C. at 3–4 mm. pressure.

The alkoxy-nitrobenzyl chloride may be converted by reaction with morpholine to alkoxy-benzyl-morpholine and by reduction with iron turnings to the alkoxy-aminobenzyl-morpholine compound by a process similar to that described under Example I. The reaction may be illustrated by the following formula:

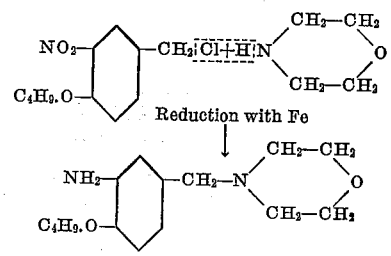

The following table listing the properties of the base and hydrochlorides will serve to illustrate various compounds of my invention:

Table

| Product | Boiling point (B. P.) or melting point (M. P.) of base | Melting point of hydrochloride °C. | Crystalline form of hydrochloride |
|---|---|---|---|
| (N)-Benzyl morpholine | B. p. 108–110° C. at 4 mm | 246–247 | Colorless plates. |
| (N)-Phenethyl-morpholine | B. p. 107–108° C. at 2–3 mm | 238 | Spur needles. |
| (N)-(α)-phenylethyl morpholine | | 211–212 | Colorless needles. |
| (N)-γ-phenylpropyl-morpholine | B. p. 113–115° C. at 2 mm | 138–139 | Fluffy needles. |
| (N)-Cinnamyl-morpholine | B. p. 132–134° C. at 3 mm | 216 | Colorless needles. |
| (N)-p-Aminobenzyl-morpholine | M. p. 100.5–101.5° C | 188–190 | Yellow leaflets. |
| (N)-o-Aminobenzyl-morpholine | B. p. 150° C. at 4 mm | | |
| (N)-p-Aminophenethyl-morpholine | M. p. 80.5–81.5° C | | Yellow flakes. |
| (N)-(γ)-p-Aminophenyl-propyl-morpholine | B. p. 155–160° C. at 2 mm | 197–198 | Colorless plates. |
| (N)-Benzyl-2,6-dimethyl-morpholine | B. p. 102–104° C. at 3 mm | | |
| (N)-γ-phenylpropyl-2,6-dimethyl-morpholine | B. p. 115–118° C. at 3 mm | 184–185 | Needles. |
| (N)-Cinnamyl-2,6-dimethyl-morpholine | B. p. 140–142° C. at 2–3 mm | | |
| (N)-p-Aminobenzyl-2,6-dimethyl-morpholine | | | |
| (N)-p-Bromobenzyl-morpholine | | 214 | Needles. |
| (N)-o-Bromobenzyl-morpholine | M. p. 83–84° C | 280–282 | Colorless prisms. |
| (N)-p-Chlorobenzyl-morpholine | | 216–217 | Colorless needles. |
| (N)-p-Chlorobenzyl-2,6-dimethyl-morpholine | M. p. 68–69° C | 258 | Colorless plates. |
| (N)-m,m'-dibromo-p-aminobenzyl-morpholine | | 189–190 | Colorless needles. |
| (N)-p-Amino-m-bromo-benzyl-morpholine | | 260 | Colorless prism. |
| (N)-o-(n)-Butoxybenzyl-morpholine | | 159.5–160 | Needlelike prisms. |
| (N)-p-methoxy-m-aminobenzyl-morpholine-dihydrate | M. p. 75–76° C | | Needles. |
| (N)-p-(n)-Butoxy-m-aminobenzyl-morpholine | | 199.5–200.5 | Needles. |
| (N)-p-Butoxy-m-bromobenzyl-morpholine | | 183.5–184.5 | Prisms. |
| (N)-p-(n)-Butylaminobenzyl-morpholine | | 180–181 | Do. |
| (N)-(α)-Naphthyl-methyl morpholine | | 234–235 | Colorless needles. |

Of the compounds coming within my invention, investigations have shown the halogen and particularly the bromine substituted aralkyl morpholines to possess properties making them particularly adaptable for use as local anesthetics. Investigations have also shown the amino substituted aralkyl morpholines to possess unusual properties which make them particularly adaptable for use as local anesthetics.

It will be obvious to those skilled in the art that my invention is not limited to the above described examples. It will also be obvious to those skilled in the art that the compounds of my invention may be used in the form of the base or in the form of salts, i. e. hydrochloride, and that the claims appended hereto directed to the base are intended to include the usual salt forms. All modifications coming within the true spirit and scope of my invention are intended to be covered by the claims annexed hereto.

I claim:
1. A bromo-benzyl morpholine.
2. (N)-p-bromobenzyl-morpholine.
3. An amino-benzyl morpholine.
4. (N)-p-aminobenzyl-morpholine.
5. (N)-m,m'-dibromo-p-aminobenzyl-morpholine.
6. A product having the formula:

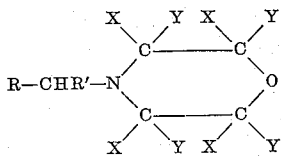

in which R represents a halogen substituted phenyl group, R' is selected from the group consisting of hydrogen and methyl groups and X and Y are selected from the group consisting of hydrogen and alkyl groups.

7. A product having the formula:

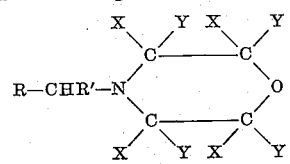

in which R represents an amino substituted phenyl group, R' is selected from the group consisting of hydrogen and methyl groups, and X and Y are selected from the group consisting of hydrogen and alkyl groups.

8. A compound having the following formula:

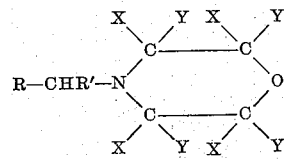

in which R is selected from the group consisting of halogen, amino and alkoxy substituted phenyl groups, R' is selected from the group consisting of hydrogen and methyl groups and X and Y are selected from the group consisting of hydrogen and alkyl groups.

MARLIN T. LEFFLER.